United States Patent
Schwengler et al.

(10) Patent No.: US 7,050,819 B2
(45) Date of Patent: May 23, 2006

(54) MESH NETWORK MOBILE UNIT WITH POSITIONING SYSTEM

(75) Inventors: Thomas Schwengler, Lakewood, CO (US); Patrick L. Perini, Broomfield, CO (US); Brian Arend, Canyon Country, CA (US)

(73) Assignee: Qwest Communications International Inc., Denver, CO (US)

( * ) Notice: Subject to any disclaimer, the term of this patent is extended or adjusted under 35 U.S.C. 154(b) by 439 days.

(21) Appl. No.: 10/196,866

(22) Filed: Jul. 16, 2002

(65) Prior Publication Data

US 2004/0198375 A1    Oct. 7, 2004

(51) Int. Cl.
*H04Q 7/20* (2006.01)

(52) U.S. Cl. .............................. 455/456.6; 455/456.1; 455/455; 455/3.05; 370/338; 370/351

(58) Field of Classification Search ................ 455/517, 455/552.1, 553.1, 3.05, 445, 456.6, 456.1; 370/338, 354, 229, 351
See application file for complete search history.

(56) References Cited

U.S. PATENT DOCUMENTS

| | | |
|---|---|---|
| 5,987,011 A | 11/1999 | Toh |
| 6,175,789 B1 | 1/2001 | Beckert et al. |
| 6,202,008 B1 | 3/2001 | Beckert et al. |
| 6,744,740 B1 | 6/2004 | Chen |
| 6,768,730 B1 | 7/2004 | Whitehill |
| 2002/0072329 A1* | 6/2002 | Bandeira et al. ................ 455/7 |
| 2002/0181427 A1* | 12/2002 | Sparr et al. .................. 370/338 |
| 2003/0003934 A1* | 1/2003 | Garces et al. ................ 455/517 |
| 2003/0040316 A1 | 2/2003 | Stanforth et al. |
| 2003/0109217 A1* | 6/2003 | Reed et al. ................. 455/3.05 |
| 2003/0162548 A1* | 8/2003 | Kujala et al. ................ 455/456 |
| 2003/0235175 A1* | 12/2003 | Naghian et al. ............. 370/338 |
| 2004/0145520 A1 | 7/2004 | Richardson et al. |
| 2004/0198337 A1 | 10/2004 | Schwengler et al. |
| 2004/0198375 A1 | 10/2004 | Schwengler et al. |

FOREIGN PATENT DOCUMENTS

WO    WO 01/19025 A2    3/2001

* cited by examiner

*Primary Examiner*—Danh Cong Le
(74) *Attorney, Agent, or Firm*—Townsend and Townsend and Crew LLP

(57) ABSTRACT

A mesh network mobile unit includes a communications arrangement operable to provide two-way communication between the unit and a mesh network and a regeneration arrangement operable to receive and retransmit signals between other mesh network mobile units and the mesh network. The unit also includes a power receiving arrangement operable to receive power from a power source, wherein the power source is selected from either an internal power source or an external power source and a power utilization arrangement operable to alternatively enable or disable the regeneration arrangement depending upon the selected power source. Embodiments of the invention also include a positioning system that determines the physical location of the mobile unit and uses the information to route signals to the unit.

10 Claims, 3 Drawing Sheets

MESH NETWORK MOBILE UNIT WITH POSITIONING SYSTEM

CROSS-REFERENCES TO RELATED APPLICATIONS

This application is related to copending, commonly assigned, and concurrently filed U.S. patent application Ser. No. 10/196,889 entitled "POWER UTILIZATION ENHANCEMENT SYSTEM AND METHOD FOR MOBILE MESH NETWORK UNITS", by Thomas Schwengler, Patrick L. Perini, and Brian Arend, which application is incorporated herein by reference in its entirety.

BACKGROUND OF THE INVENTION

The present invention relates generally to mesh networks, and more specifically to positioning determination enhancements to mesh network mobile units.

Mesh networks are well known. For example, PCT Publication WO 01/19025 A2, entitled, "SYSTEM AND METHOD FOR DYNAMIC DISTRIBUTED COMMUNICATION," published on Mar. 15, 2001, by Angus O. Dougherty, et al., which application is incorporated herein by reference in its entirety, provides a detailed description of mesh networks and the process by which such networks operate. In brief, mobile units, which are typically exclusively users of networks, may themselves become nodes of the network, thus forming a dynamic distributed network. However, a number of limitations of such networks have yet to be addressed.

For example, mobile units typically have a finite internal power supply. If no other power source is available and the unit is acting as a node, the additional power required for the signal regeneration function of the node may substantially limit the time the mobile unit may operate between charges. Thus, the unit may not have adequate power available to the user of the unit for the two-way communication function of the unit.

As another example, the dynamic nature of mobile units may complicate the routing schemes used to determine the optimal path over which to route signals using mobile units. The present invention addresses these and other heretofore unresolved issues.

BRIEF SUMMARY OF THE INVENTION

Embodiments of the present invention thus provide a mesh network mobile unit. The mobile unit includes a communications arrangement operable to provide two-way communication between the unit and a mesh network and a regeneration arrangement operable to receive and retransmit signals between other mesh network mobile units and the mesh network. The unit also includes a positioning system operable to determine the physical location of the unit and transmit information representing the physical location to the mesh network. The unit may use the physical location information to select a communications frequency. The mobile unit also may use the physical location information to route signals to the unit. The positioning system may be a Global Positioning System. The position may include a receiving arrangement that receives information comprising a position from the network. The mesh network may determine the physical location of the mobile unit using triangulation from a plurality of access points. The mesh network may use the positioning information to route a pilot signal to the mobile unit.

In other embodiments, a method of operating a mobile mesh network includes receiving information representing the physical location of a mesh network mobile unit and establishing communication with the mesh network mobile unit. The mobile unit is further operable to receive and retransmit signals between other mesh network mobile units and the mesh network. The mobile unit may be operable to use the physical location information to select a communications frequency. The method may include using the physical location information to route signals to the unit. The physical location of the mesh network mobile unit may be determined using a Global Positioning System. The physical location of the mesh network mobile unit may be determined by the network. The physical location of the mesh network mobile unit may be determined using triangulation from a plurality of access points. The method also may include using the positioning information to route a pilot signal to the mobile unit.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Figure 1:
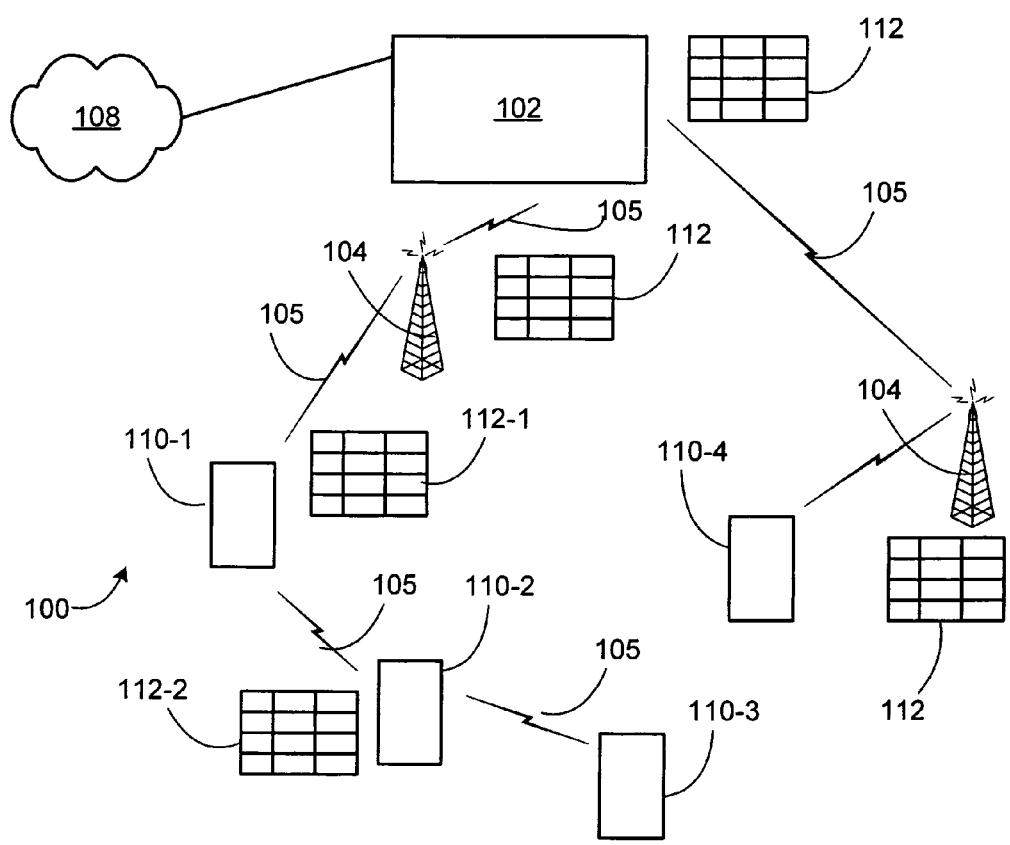
FIG. 1 is a schematic drawing illustrating a portion of a mobile mesh network according to an embodiment of the present invention.

Systems and methods for operating mobile mesh networks are herein disclosed. Referring to FIG. 1, one example of a mesh network 100 is illustrated. In light of the disclosure herein, many other examples are apparent to those skilled in the art. Thus, the example of FIG. 1 is not to be considered limiting. The mesh network 100 includes a network supervisor 102 and a plurality of fixed network access/distribution points 104. The mesh network 100 may be any of a wide variety of well known communications networks and operate according to any one or combination of many different protocols. The access/distribution points 104 may be in communication with each other and the network supervisor 102 through wireless and/or wireline connections 105. The mesh network 100 may also be connected to other networks 108, such as the Internet, via an interface 106, such as a gateway.

The access/distribution points 104 allow mobile units 110, or subscriber units, to establish two-way wireless links to the mesh network 100. Each mobile unit 110 may be a mobile telephone, a computer, a personal digital assistant (PDA), a two-way wireless pager, or any other suitable communication device. The mobile units 110 communicate with the mesh network 100 according to well known protocols, many of which protocols utilize algorithms to efficiently route signals to mobile units. Such algorithms typically use information tables 112, such as routing tables, that store information such as node addresses, mobile unit addresses and locations, and the like. As will be described below, according to the present invention, the information tables 112 may include power selection information for one or more mobile units 110.

In dynamically distributed networks, such as mesh network 100, some mobile units 110 may themselves become access points for other mobile units. For example, the mobile unit 110-1 is an access point in the mesh network 100 for the mobile unit 110-2, and the mobile unit 110-2 is an access point for the mobile unit 110-3. As an access point, the mobile units 110-1 and 110-2 receive signals from other mobile units and route the signals through the network to their destinations. This "regeneration" function is in addition to the two-way communication function typically performed by the unit. Communication protocols for wireless networks and methods for adding nodes to dynamically distributed networks, such as the mesh network 100, are more fully explained in previously incorporated PCT publication WO 01/19025 A2.

Figure 2:
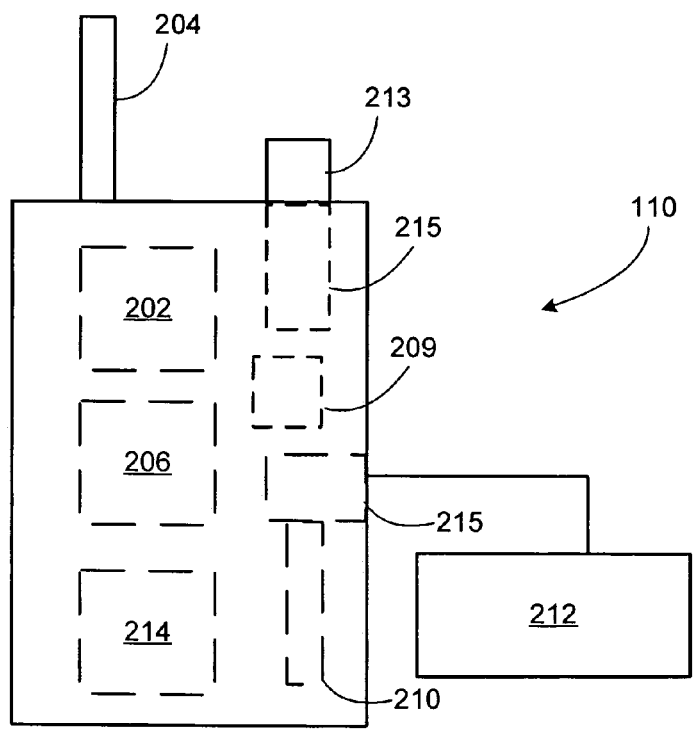
FIG. 2 is a schematic drawing illustrating a mesh network mobile unit that may be used in the mesh network of FIG. 1.

FIG. 2 illustrates a mobile unit 110 in greater detail. As stated previously, the mobile unit 110 may be any of a variety of two-way communication devices, such as a mobile phone, a computer, a PDA, a wireless pager, and the like. The mobile unit 110 includes communications arrangement 202 that provides two-way, wireless communication between the mobile unit 110 and the mesh network 100 via an antenna 204. The mobile unit 110 also includes a regeneration arrangement 206 that provides receipt and retransmission of signals between other mobile units and the mesh network. The mobile unit 110 also includes a power utilization arrangement 208 that senses whether the mobile unit is receiving power, via the power receiving arrangement 209, from an internal power source 210 or an external power source 212. As will be explained further below, the power utilization function is further operable to selectively enable or disable the function of the regeneration arrangement 206 depending upon the selected power source. The power utilization arrangement 208 may also include a selection arrangement 213 that receives a user input. The selection arrangement 213 may be a switch, button, dial, or any other suitable user input device. The user input may override the function of the power utilization arrangement 208, as will be described in more detail below. Additionally, the mobile unit 110 includes a positioning system 214, such as a Global Positioning System, capable of determining the physical location of the mobile unit and transmitting the information to the mesh network 100, as will be explained further below. The mobile unit 110 may also include a transmitter 215 that transmits the position information and/or the power selection information to the network. Alternatively, the position information and power selection information may be transmitted to the network by the communications arrangement 202. In the illustrated embodiment, the communication arrangement 202, the regeneration arrangement 206, the power utilization arrangement 208, the power receiving arrangement 209, the selection arrangement 213, the positioning system 214, and the transmitter 215 are shown as separate components. However, one skilled in the art will appreciate that these components can be configured together as one or more circuits, or the functionality can be embodied in microprocessor or ASIC chips.

The mobile unit 110 may access the network 100 as a network user. Once in communication with the network 100, the mobile unit 110 may become a node of the network and serve as an access point for other mobile units. This would require that the regeneration arrangement 206 receive and retransmit signals from other mobile units. However, under certain conditions, it may not be advantageous for the mobile unit 110 to function as a node.

In one example, mobile units, such as mobile unit 110, typically include an internal power supply, such as the internal power source 210, which may be a battery, such as a nickel-medal-hydride (NiMH) battery, or the like. Such internal power sources have a finite "cycle time," the time the power source may power a mobile unit before the battery has to be recharged. Because the regeneration function of the mobile unit may require additional power from the power source, the regeneration function may shorten cycle time. Therefore, the power utilization arrangement 208 may be configured to disable the regeneration function when the mobile unit 110 is operating exclusively on internal power.

In another example, if the mobile unit 110 is operating on external power, such as a car battery or a wall outlet in a business or residence, the power utilization arrangement 208 may be configured to allow the unit to operate as a node unless a user overrides the regeneration function. The user may override the regeneration function by making the appropriate selection using the selection arrangement 213. For any number of reasons, the user may not wish to have the unit operate as a node. For example, it may be the case that the regeneration function interferes with the proper operation of other functions. It also may be the case that the user is charging the internal power source 210 and desires the charging to proceed as quickly as possible. If the regeneration function impedes the charging function, the user may desire to disable the regeneration function.

In yet another example, the external power supply also may be a limited capacity power supply. The external power supply may be, for example, a solar cell, which may not have the capacity to operate both the normal functions of the mobile unit, as well as the regeneration function. Therefore, the user may disable the regeneration function in such cases, again using the selection arrangement 213. Alternatively, the power utilization arrangement 208 may be configured to sense the capacity of the external power source and disable the regeneration function if the capacity is below a certain threshold.

In still another example, the user may desire to enable the regeneration function despite being on internal power. For instance, if the user is attempting to provide access for another unit beyond the reach of an access/distribution point 104, the user may override the power utilization arrangement 208, using the selection arrangement 213, and allow the regeneration function. Other examples also are possible.

The positioning system 214 determines the physical location of the mobile unit in any of a number of ways. In some embodiments, the positioning system 214 may be Global Positioning System (GPS) receiver that determines the location using signals from satellites, as is known in the art. In other embodiments, the positioning system 214 may cooperate with the mesh network to determine location information. For example, the mesh network 100 may use two or more fixed network points, such as access/distribution points 104, that are in communication with the mobile unit to measure the strength of the received signal. Based on this information, the mesh network may determine the physical location of the mobile unit. If only two access points are in communication with the mobile unit, the mesh network 100 may require additional information, such as the rate of change of the signal strength, to accurately determine the mobile unit's location. As one skilled in the art will appreciate, other methods for determining the location of mobile units also may be used. Once the location of the mobile unit is determined, the mesh network may then transmit this information to the mobile units and distribute the information throughout the mesh network 100 for storage in the information tables 112 where the information may be used advantageously.

The positioning information may be used for a number of advantageous purposes. In some embodiments, the information may be used by the mesh network 100 to efficiently route signals to the mobile unit. For example, if the mobile unit moves with respect to its access point, signals destined for the mobile unit may be more appropriately routed through a different access point. The advantage is even greater if the mobile unit is accessing the network through another mobile unit. The position information for each mobile unit may be used to effectuate handoffs to other mobile units or access points as the routing algorithm dictates.

In other embodiments, the mobile unit may use the positioning information to determine the appropriate transmission frequency to use for the location. In accordance with this embodiment, the mobile unit may periodically receive updated frequency information from the network and store the information in a memory element associated with the mobile unit. This use of the positioning information may be particularly advantageous for mobile units initiating contact with the network. If the mobile unit is unable to receive a pilot signal that includes frequency information, then the mobile unit may select the appropriate frequency for the location and broadcast a message on the frequency. The message may include position information that assists the network to route a pilot signal to the mobile unit to establish contact.

In some locations, laws, license agreements, or other requirements may dictate that the mobile unit receive a signal before the unit is allowed to transmit on certain frequencies. Such requirements are generally referred to as "listen before talk" restrictions. In such circumstances, the positioning information also may be used advantageously. The mobile unit may be allowed to select unlicensed frequencies over which position information may be broadcast. Once this information is received by the network, a pilot signal may be routed to the mobile unit, as discussed above, to establish communication. Many other examples also are possible.

In still other embodiments, the positioning information may be used together with the power utilization arrangement 208 discussed above. For example, mobile units on internal power and having the regeneration function disabled may be in the vicinity of a new mobile unit attempting to access the network, yet unable to receive a pilot signal. In order to route a pilot signal to the new mobile unit, as discussed above, the mesh network may send a signal that temporarily overrides the power utilization arrangement of the nearby mobile units, thus allowing the mobile units to regenerate the pilot signal. Once the new unit has established communication with the network, the nearby mobile units may again disable the regeneration function, thus conserving internal battery power.

Figure 3:
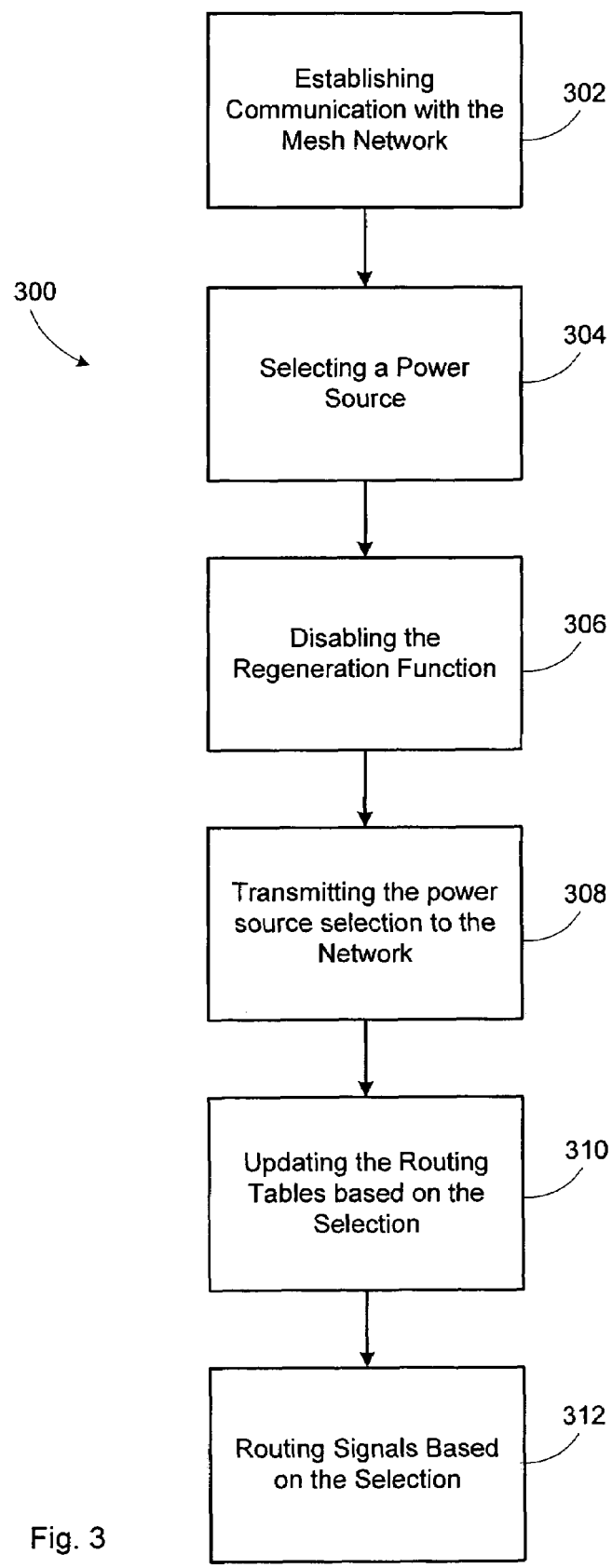
FIG. 3 is a flow diagram illustrating a first method of operating a mesh network mobile unit according to embodiments of the present invention.

Attention is now directed to FIG. 3, which illustrates a method 300 of using a mesh network mobile unit according to embodiments of the present invention. The method 300 begins at operation 302, wherein the mobile unit establishes communication with the network. This operation may include establishing operation as a node, wherein the mobile unit regenerates signals from other mobile units. At operation 304, the user of the mobile unit selects or changes the mobile unit's power source. It may be the case that operation 304, or other operations, precedes operation 302. At operation 306, the regeneration function may be disabled, for example, if an internal power source is selected, as discussed previously. At operation 308, the power source information is transmitted to the network for storage in information tables. The information tables are updated at operation 310. At operation 312, the power selection information may be used by the network to route signals through the network.

Figure 4:
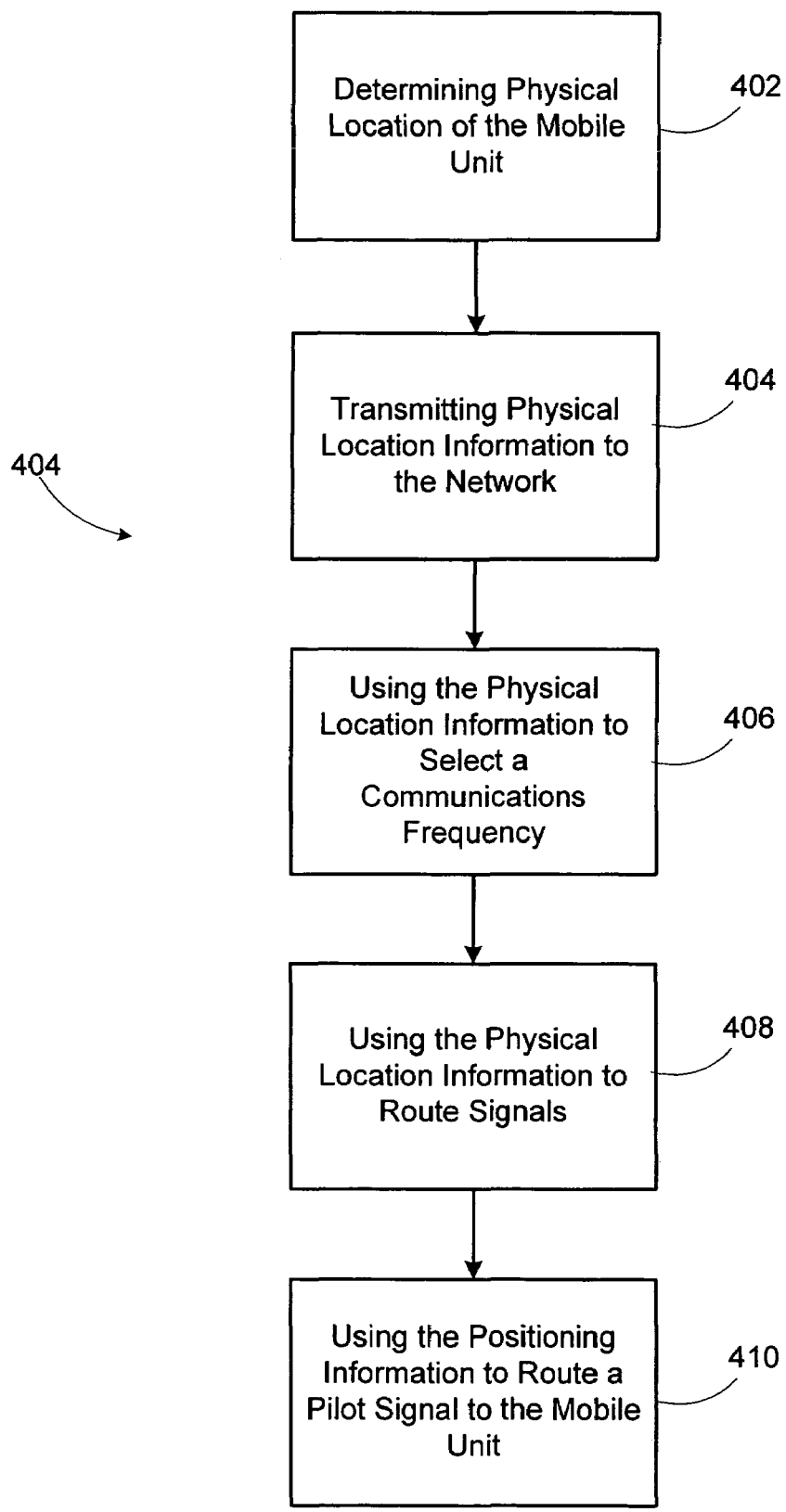
FIG. 4 is a flow diagram illustrating a second method of operating a mesh network mobile unit according to embodiments of the present invention.

Attention is now directed to FIG. 4, which illustrates a second method 400 for using a mesh network mobile unit. At operation 402, the unit, or the unit in combination with the network, determines the physical location of the unit. At operation 404, the location information is transmitted to the network. At operation 406, the unit uses the physical location information to select a communications frequency. At operation 408, the network uses the physical location information to route signals to and/or from the unit. At operation 410, the network uses the position information to route a pilot signal to the mobile unit.

Having described several embodiments, it will be recognized by those skilled in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to construct a mesh network and enable communication among subscriber units. Accordingly, the above description should not be taken as limiting the scope of the invention, which is defined in the following claims.

What is claimed is:

1. A mesh network mobile unit, comprising:
   a communications arrangement operable to provide two-way communication between the unit and a mesh network;
   a regeneration arrangement operable to receive and retransmit signals between other mesh network mobile units and the mesh network;
   a positioning system operable to determine the physical location of the unit and transmit information representing the physical location to the mesh networks; and
   a frequency selection arrangement configured to use the physical location to select a communications frequency.
   wherein the mesh network uses the positioning information to route a pilot signal to the mobile unit.

2. The mesh network mobile unit of claim 1, wherein the network uses the physical location information to route signals to the unit.

3. The mesh network mobile unit of claim 1, wherein the positioning system comprises a Global Positioning System.

4. The mesh network mobile unit of claim 1, wherein the positioning system comprises a receiving arrangement that receives information comprising a position from the network.

5. The mesh network mobile unit of claim 4, wherein the mesh network determines the physical location of the mobile unit using triangulation from a plurality of access points.

6. A method of operating a mobile mesh network, comprising:
- receiving information representing the physical location of a mesh network mobile unit;
- using the physical location to select a communications frequency; and
- establishing communication with the mesh network using the communications frequency;
- wherein the mobile unit is further operable to receive and retransmit signals between other mesh network mobile units and the mesh network and using the positioning information to route a pilot signal to the mobile unit.

7. The method of operating a mobile mesh network of claim 6, further comprising using the physical location information to route signals to the unit.

8. The method of operating a mobile mesh network of claim 6, wherein the physical location of the mesh network mobile unit is determined using a Global Positioning System.

9. The method of operating a mobile mesh network of claim 6, wherein the physical location of the mesh network mobile unit is determined by the network.

10. The method of operating a mobile mesh network of claim 9, wherein the physical location of the mesh network mobile unit is determined using triangulation from a plurality of access points.

* * * * *